(12) United States Patent  (10) Patent No.: US 7,675,260 B2
Sugie  (45) Date of Patent: Mar. 9, 2010

(54) MOTOR DRIVING APPARATUS

(75) Inventor: Hisashi Sugie, Kyoto (JP)

(73) Assignee: Rohm Co., Ltd. (JP)

( * ) Notice: Subject to any disclaimer, the term of this patent is extended or adjusted under 35 U.S.C. 154(b) by 283 days.

(21) Appl. No.: 11/794,081

(22) PCT Filed: Dec. 20, 2005

(86) PCT No.: PCT/JP2005/023322

§ 371 (c)(1),
(2), (4) Date: Jun. 22, 2007

(87) PCT Pub. No.: WO2006/068116

PCT Pub. Date: Jun. 29, 2006

(65) Prior Publication Data

US 2008/0107408 A1 May 8, 2008

(30) Foreign Application Priority Data

Dec. 22, 2004 (JP) .............................. 2004-371335

(51) Int. Cl.
H02P 1/18 (2006.01)

(52) U.S. Cl. ........................ 318/778; 318/727; 318/494; 318/766

(58) Field of Classification Search .................. 318/778, 318/727, 494, 766
See application file for complete search history.

(56) References Cited

U.S. PATENT DOCUMENTS

| 4,045,973 A | * | 9/1977 | Anderson et al. ............... 62/158 |
| 4,282,464 A | * | 8/1981 | Uzuka .................... 318/400.26 |
| 4,329,725 A | * | 5/1982 | Hart ............................. 361/18 |
| 4,900,993 A | * | 2/1990 | Yasohara et al. ........ 318/400.04 |
| 4,973,896 A | * | 11/1990 | Shiga et al. ..................... 322/28 |
| 5,210,479 A | * | 5/1993 | Kimura et al. ............... 318/727 |
| 5,508,579 A | * | 4/1996 | Suganuma ............. 310/316.02 |
| 5,608,300 A | * | 3/1997 | Kawabata et al. ............ 318/721 |
| 5,684,427 A | * | 11/1997 | Stoddard et al. ............. 327/483 |
| 7,064,513 B2 | * | 6/2006 | Fenley ......................... 318/700 |
| 7,183,691 B2 | * | 2/2007 | Yamamoto ............. 310/316.01 |

FOREIGN PATENT DOCUMENTS

JP  55-100490  7/1980
JP  100490  * 7/1980

(Continued)

OTHER PUBLICATIONS

International Search Report for International Application No. PCT/JP2005/023322 dated Mar. 20, 2006.

(Continued)

Primary Examiner—Rita Leykin
(74) Attorney, Agent, or Firm—Cantor Colburn LLP

(57) ABSTRACT

In a motor driving apparatus, a control unit detects a rotation frequency of a motor to be driven and generates a control voltage Vcnt in a manner such that the rotation frequency thereof is brought close to a desired rotation frequency. A clamping circuit sets an upper limit Vcu and a lower limit Vcl of the control voltage Vcnt. A drive unit drives the motor based on the control voltage Vcnt generated by the control unit. A start circuit fixes the control voltage Vcnt to a predetermined initial voltage Vinit at the start of driving the motor.

7 Claims, 6 Drawing Sheets

FOREIGN PATENT DOCUMENTS

| | | | |
|---|---|---|---|
| JP | 58-33982 | | 2/1983 |
| JP | 5833982 | * | 2/1983 |
| JP | 6-30589 | | 2/1994 |
| JP | 0630589 | * | 2/1994 |
| JP | 8-7402 | | 1/1996 |
| JP | 0087402 | * | 1/1996 |
| JP | 3282218 | | 3/2002 |
| JP | 3282218 | * | 5/2002 |

OTHER PUBLICATIONS

Written Opinion of the International Searching Authority for International Application No. PCT/JP2005/023322.

* cited by examiner

MOTOR DRIVING APPARATUS

CROSS REFERENCE TO RELATED APPLICATIONS

This is a U.S. national stage of application No. PCT/JP2005/023322, filed on 20 Dec. 2005. Priority under 35 U.S.C. §119(a) and 35 U.S.C. §365(b) is claimed from Japanese Application No. 2004-371335, filed 22 Dec. 2004,the disclosure of which is also incorporated herein by reference.

BACKGROUND OF THE INVENTION

1. Field of the Invention

The present invention relates to a motor driving apparatus and it particularly relates to a technique for controlling the rotation frequency of a motor.

2. Description of the Related Art

In a motor driving apparatus that rotates a DC motor or spindle motor at a desired rotation frequency thereof, the rotation frequency of a motor is monitored and a driving signal is generated based on a deviation thereof from a desired target value.

There are cases where a speed discriminator as described in Patent Document 1, for example, is used in the motor driving apparatus that controls the motor in this manner.

The speed discriminator compares the current rotation frequency of the motor with the rotation frequency that serves as the desired target value, and outputs an acceleration pulse or a deceleration pulse according to the deviation. This acceleration pulse and the deceleration pulse are converted to the DC voltage, so that a control voltage for driving the motor is produced.

[Patent Document 1]

Japanese Patent Application Laid-Open No. Hei06-30589.

As described above, the speed discriminator generates the acceleration and deceleration pulses based on the deviation of the current rotation frequency of the motor from the target value of the rotation frequency thereof, so that a feedback path is formed in the motor driving apparatus. A low-pass filter for smoothing the control voltage obtained by converting the acceleration and deceleration pulses is provided in this feedback path.

In such a motor driving apparatus, when the rotation of the motor is started from a motor stoppage state, an acceleration pulse is generated from the speed discriminator and thus the control voltage for driving the motor rises up rapidly. Nevertheless, since high-frequency components are removed by the low-pass filter, a starting time required until the rotation frequency of the motor reaches a desired target value will become longer due to the effect of a time constant of the low-pass filter. Also, since the bandwidth of a feedback path is narrowed by the low-pass filter, an overshoot that exceeds considerably the desired target value may occur and a ringing may occur.

SUMMARY OF THE INVENTION

The present invention has been made in view of the foregoing problems, and a general purpose thereof is to provide a motor driving apparatus which shortens the starting time of a motor.

One embodiment of the present invention relates to a motor driving apparatus. This motor driving apparatus comprises: a control unit which detects a rotation frequency of a motor to be driven and generates a control voltage in a manner such that the rotation frequency thereof is brought close to a desired rotation frequency; a drive unit which drives the motor based on the control voltage generated by the control unit; and a start circuit which fixes the control voltage to a predetermined initial voltage at the start of driving the motor.

According to this embodiment, the control voltage is set to a predetermined initial voltage by the start circuit. Thereby, that the control voltage rises up precipitously and the motor starts rotating at full torque is prevented, so that the starting time required until a desired rotation frequency is reached can be reduced.

The start circuit may adjust the initial voltage according to a drive condition of the motor.

The "drive condition of the motor" includes various conditions such as a target value of the motor, the type of the motor, the ambient temperature and the supply voltage. There are cases where a difference in the drive condition of the motor results in a change of an optimum initial voltage. Thus, the starting time can be further preferably shortened by so configuring the start circuit as to be adjustable according to each condition.

The initial voltage may be stored in a register according to each of the various drive conditions. Then the optimum start-up control can be performed by reading out an initial value from the register, as appropriate, according to the drive condition.

The control circuit further includes a clamping circuit which sets an upper limit and a lower limit of the control voltage, and the start circuit may be set active for a predetermined period of time at the start of driving the motor, and the clamping circuit may be set active after the predetermined period of time has elapsed.

Since the motor driving apparatus sets an upper limit and a lower limit of motor torque, there are cases where it is equipped with a clamping circuit that clamps the control voltage. In this case, the control unit sets the start circuit active at the start of driving a motor and, thereafter, sets the clamping circuit active so as to perform a normal operation. As a result the staring time of the motor can be shortened.

The clamping circuit maybe structured integrally with the start circuit, and at least one of the upper limit and the lower limit of the control voltage may be set to the initial voltage for a predetermined period of time at the start of driving the motor.

Also, the control voltage can be fixed to the initial voltage by setting the clamping voltage of the clamping circuit to the initial voltage. The circuitry can be simplified.

The control unit may include: a speed discriminator which generates an acceleration pulse and a deceleration pulse based on a deviation of a speed signal indicating the rotation frequency of the motor from the desired rotation frequency; and a voltage generator which generates the control voltage based on a pulse generated by the speed discriminator. The start circuit may fix the speed signal inputted to the speed discriminator at the start of driving the motor, to a predetermined initial value.

Before the rotation frequency of a motor rises immediately after the start of the driving of the motor, the speed signal inputted to the speed discriminator takes a low value but this speed signal is fixed to a predetermined initial value. Thus, the control unit generates a control voltage fixed to a certain value and thereby the starting time can be shortened.

The start circuit may adjust a period of time during which the control voltage is fixed to the initial voltage, according to a drive condition of the motor.

By varying the period, during which the start circuit is being set active, according to a drive condition of the motor, the starting time can be further preferably shortened.

The start circuit may fix the control voltage for a period of time from the start of driving the motor until the rotation frequency of the motor reaches a predetermined rotation frequency. The predetermined rotation frequency may be set based on a target value of the rotation frequency of the motor.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

Figure 1:
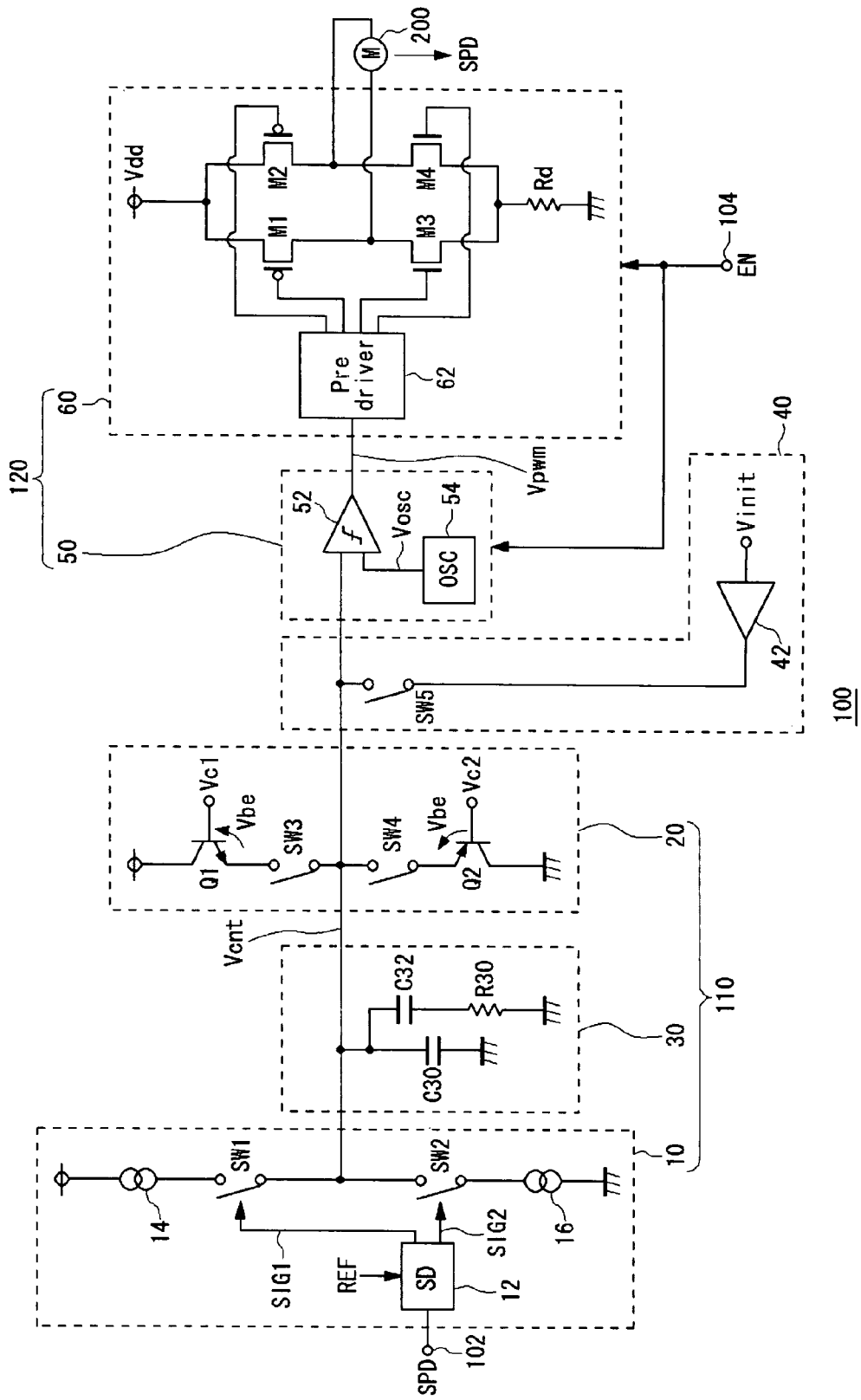
FIG. 1 shows a structure of a motor driving apparatus according to an embodiment.

FIG. 1 shows a structure of a motor driving apparatus 100 according to an embodiment. A motor 200 to be driven is also shown in FIG. 1 together with the motor driving apparatus 100.

This motor driving apparatus 100 monitors the rotation frequency of the motor 200, and drives the motor 200 so that the rotation frequency thereof is brought close to a desired target value. The rotation frequency of the motor 200 is detected by an unshown speed detection unit, and the speed information thereof is inputted to a speed terminal 102 as a speed signal SPD. For instance, the speed detection unit may convert a current flowing to the motor into speed information by detecting the current or may detect the speed using a Hall element. In the present embodiment, it is assumed that the speed signal SPD is a periodic signal having a frequency proportional to the rotation frequency of a motor.

The motor driving apparatus 100 includes a control unit 110, a drive unit 120, and a start circuit 40.

The control unit 110 compares the speed signal SPD indicating the current rotation frequency of a motor inputted to the speed terminal 102 against the target value of the rotation frequency, and generates a control voltage Vcnt based on the deviation therefrom. The motor driving apparatus 100 includes an enable terminal 104, and it drives the motor 200 when an enable signal EN is at a high level.

This control unit 110 includes a control voltage generator 10, a clamping circuit 20, and a filter 30.

The control voltage generator 10 includes a speed discriminator 12, a first constant current source 14, a second constant current source 16, a first switch SW1, and a second switch SW2.

The speed discriminator 12 compares the frequency of a reference clock signal REF indicating target value of the rotation frequency of the motor 200 against the speed signal SPD. When the rotation frequency of the motor 200 is lower than the target value, the speed discriminator 12 outputs an acceleration pulse SIG1 for a time duration corresponding to the difference therebetween. When the rotation frequency of the motor 200 is higher than the target value, the speed discriminator outputs a deceleration pulse SIG2 for a time duration corresponding to the difference therebetween.

The first constant current source 14, the second constant current source 16, the first switch SW1, the second switch SW2 and the filter 30 constitutes a control voltage generator which converts the acceleration pulse SIG1 and the deceleration pulse SIG2 generated by the speed discriminator 12 into a DC control voltage Vcnt.

The first constant current source 14 is a current supply for charging a first capacitor C30, whereas the second constant current source 16 is a current supply for discharging the first capacitor C30. The first constant current source 14 is connected with the first capacitor C30 via the first switch SW1. Similarly, the second constant current source 16 is connected with the first capacitor C30 via the second switch SW2.

Now, when the acceleration pulse SIG1 is outputted, the first switch SW1 turns on and the first capacitor C30 is charged by the first constant current source 14, so that the control voltage Vcnt rises. Conversely, when the deceleration pulse SIG2 is outputted, the second switch SW2 turns on and the first capacitor C30 is discharged by the second constant current source 16, so that the control voltage Vcnt drops.

The filter 30 includes a first capacitor C30, a second capacitor C32, and a resistor R30. Since the control voltage Vcnt is generated by repeating the charging and the discharging by the acceleration pulse SIG1 and the deceleration pulse SIG2, it contains a high-frequency noise component. The high-frequency component in the control voltage Vcnt is removed by a low-pass filter effect of this filter 30.

In this manner, the control voltage Vcnt is outputted from the control unit 110 so that the rotation frequency of the motor 200 to be driven is brought close to a desired target value.

The clamping circuit 20 sets an upper limit Vcu and a lower limit Vcl of the control voltage Vcnt. The clamping circuit 20 includes a first transistor Q1, a second transistor Q2, a third switch SW3, and a fourth switch SW4.

The first transistor Q1 is an NPN-type bipolar transistor where a minimum clamping voltage Vc1 is applied to a base terminal. An emitter terminal is connected to an output terminal of the control unit 110 via the third switch SW3.

When the control voltage Vcnt drops with the third switch SW3 being on, the first transistor Q1 turns on. With the first transistor Q1 being on, the voltage Vel of the emitter terminal is clamped to Vcl=Vc1−Vbe, by the minimum clamping voltage Vcl applied to the base terminal, where the voltage Vbe denotes a forward voltage between the base and the emitter of the bipolar transistor.

Similarly, the second transistor Q2 is a PNP-type bipolar transistor where a maximum clamping voltage Vc2 is applied to a base terminal. And an emitter terminal is connected to the output terminal of the control unit 110 via the fourth switch SW4.

When the control voltage Vcnt rises with the fourth switch SW4 being on, the second transistor Q2 turns on. Then the voltage Vcnt, which is an emitter voltage thereof, is clamped to Vcu=Vc2+Vbe.

The on and off of the third switch SW3 and the fourth switch SW4 is controlled from outside according to an operating state of the motor driving apparatus 100.

At the start of driving the motor 200, the start circuit 40 fixes the control voltage Vcnt to a predetermined initial voltage Vinit. This start circuit 40 includes a fifth switch SW5 and a buffer 42. The initial voltage Vinit is inputted to the buffer 42, and the output thereof is connected to the output terminal of the control unit 110 via the switch SW5. As the fifth switch SW5 turns on, the control voltage Vcnt appearing at the output terminal of the control unit 110 is fixed to the initial voltage Vinit. Similar to the above-described third switch SW3 and the fourth switch SW4, the on and off of the fifth switch SW5 is also controlled from outside according to an operating state of the motor driving apparatus 100.

The control voltage Vcnt is inputted to the drive unit 120. The drive unit 120, which includes a pulse width modulator 50 and an output unit 60, drives the motor 200 based on the control voltage Vcnt generated by the control unit 110.

The pulse width modulator 50, which includes a voltage comparator 52 and an oscillator 54, generates a pulse-width-modulation (PWM) signal Vpwm which varies the on period based on the inputted control voltage Vcnt.

The oscillator 54 outputs a periodic voltage Vosc of triangular wave or sawtooth wave pattern.

The control voltage Vcnt and the periodic voltage Vosc are inputted to the voltage comparator 52 from the control unit 110 and the oscillator 54, respectively. The voltage comparator 52 compares the control voltage Vcnt against the periodic voltage Vosc, and it outputs a high level when Vosc>Vx and it outputs a low level when Vosc<Vx. The PWM signal Vpwm outputted from the voltage comparator 52 is a pulse-width-modulated signal in which the period of high level and low level varies according to the level of the control voltage Vcnt.

Here, the control voltage Vcnt outputted from the control unit 110 is a voltage that varies according to the deviation of the rotation frequency of the motor 200 from a target value thereof. Thus, the duty ratio of the PWM signal Vpwm varies in a manner such that the rotation frequency of the motor 200 is brought close to the target value. The PWM signal Vpwm generated by the pulse width modulator 50 is inputted to the output unit 60.

The output unit 60 includes a pre-driver circuit 62, switching transistors M1 to M4 and a detection resistor Rd, and the motor 200 is driven based on the PWM signal Vpwm.

The switching transistors M1 to M4 are each a MOSFET (Metal Oxide Semiconductor Field Effect Transistor), performs a switching operation according to a voltage applied to a gate terminal thereof, and supplies a drive voltage intermittently to the motor 200. These switching transistors M1 to M4 constitute an H-bridge circuit. With the switching transistors M1 and M3 being off, turning on and off the switching transistors M1 and M4 synchronously applies a supply voltage Vdd to one terminal of the motor 200 and applies a voltage close to ground voltage to the other terminal so as to be able to rotate the motor 200 in a certain direction. The detection resistor Rd converts a motor current flowing to the motor 200 into a voltage. The speed signal SPD inputted to the above-described control voltage generator 10 may be generated from a voltage appearing across the detection resistor Rd.

The pre-driver circuit 62 controls the on and off of the switching transistors M1 to M4, based on the PWM signal Vpwm outputted from the pulse width modulator 50. During an ON period of the PWM signal Vpwm, the pre-driver circuit 62 turns on either a pair of switching transistors M1 and M4 or a pair of switching transistors M2 and M3 so as to apply the drive voltage to the motor 200. Thus, the longer the ON period of the PWM signal Vpwm, the drive voltage is applied to the motor 200 with the result that the motor 200 is rotated with a larger torque, namely, a higher rotation frequency.

An enable signal EN is inputted to the pulse width modulator 50 and the output unit 60. When the enable signal EN goes to a high level, the motor 200 is driven; and when it goes to a low level, the driving of the motor 200 is stopped. When the enable signal EN is at a low level, the pre-driver circuit 62 and/or the voltage comparator 52 may be turned off for power saving purposes.

A description will now be given of an operation of the motor driving apparatus 100 structured as above.

Figure 2:
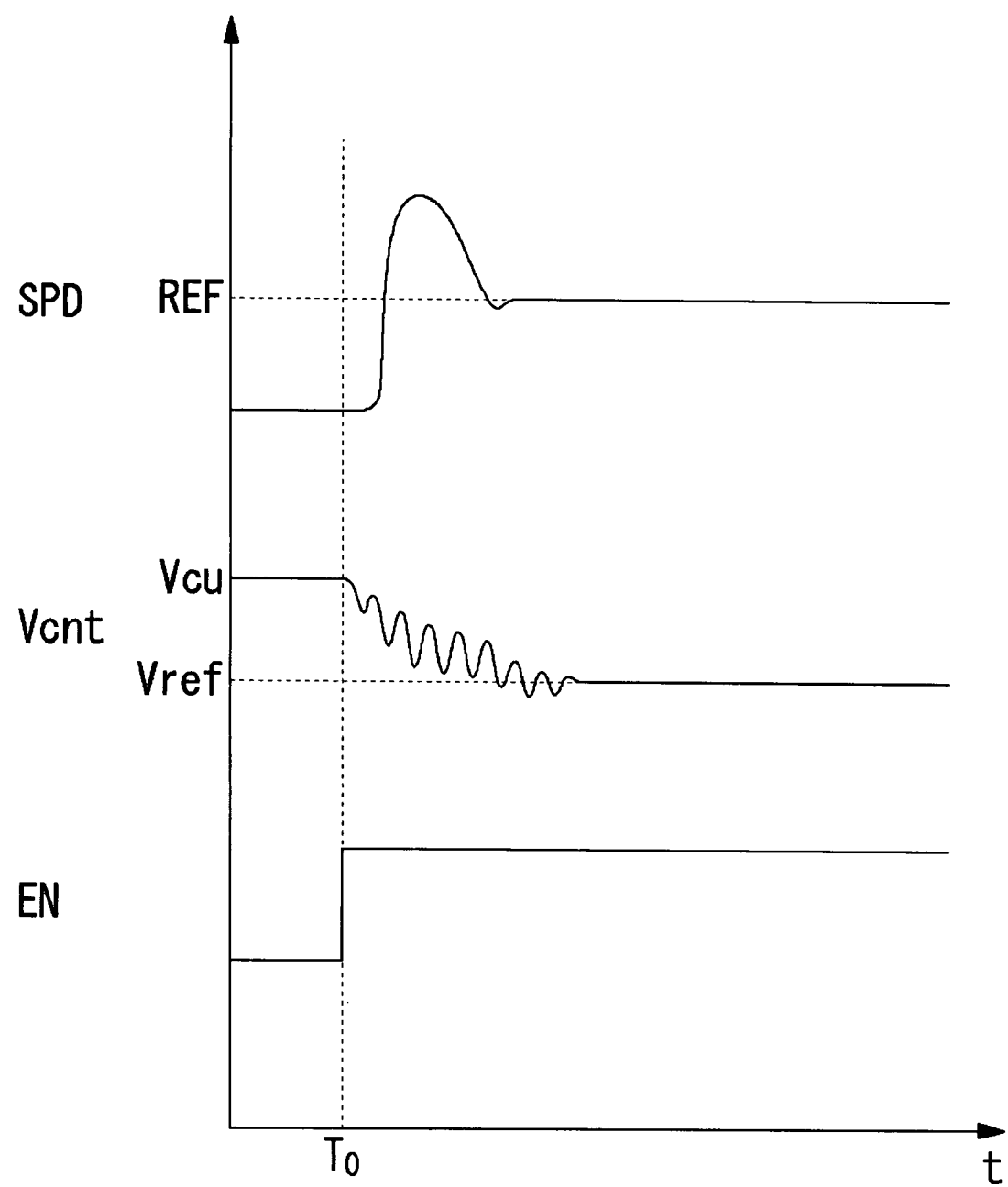
FIG. 2 is a signal waveform diagram showing an operating state of a motor driving apparatus when a start circuit is not activated.

To further clarify the effects of the motor driving apparatus 100, a description is first given of a case where the start circuit 40 is not activated but the clamping circuit 20 only is set active. FIG. 2 is a signal waveform diagram showing an operating state of the motor driving apparatus 100 when the start circuit 40 is not operated.

The rotation of the motor 200 is stopped before time T0 and therefore the speed signal SPD indicating the rotation frequency of the motor takes a minimum value. At this time, the acceleration pulse SIG1 continues to be outputted from the speed discriminator 12, so that the control voltage Vcnt rises and is clamped to the upper limit Vcu by the clamping circuit 20.

At time T0, the enable signal EN goes to a high level and the start of the driving of the motor 200 is specified. As the enable signal EN goes to the high level, the drive unit 120 starts driving the motor 200, at full torque, based on the control voltage Vcnt. At the start of the rotation, the rotation frequency starts rising with a delay from time T0 due to a static friction force exerted on the motor 200. Then, the rotation frequency of the motor 200 rises up precipitously and exceeds a target value REF.

As the rotation frequency of the motor 200 exceeds the desired target value REF, the deceleration pulse SIG2 is outputted from the speed discriminator 12 and the control voltage Vcnt drops. A the same time, since high-frequency components are removed by the filter 30 provided in a feedback loop, the response cannot follow the rapid increase in rotation frequency of the motor 200 and therefore the rotation frequency of the motor 200 results in a large overshoot. Thereafter, the control voltage Vcnt gradually approaches the target value REF.

In this manner, if the start circuit 40 is not activated, problems will arise where a longer starting time is required and the rotation frequency suffers an overshoot.

Figure 3:
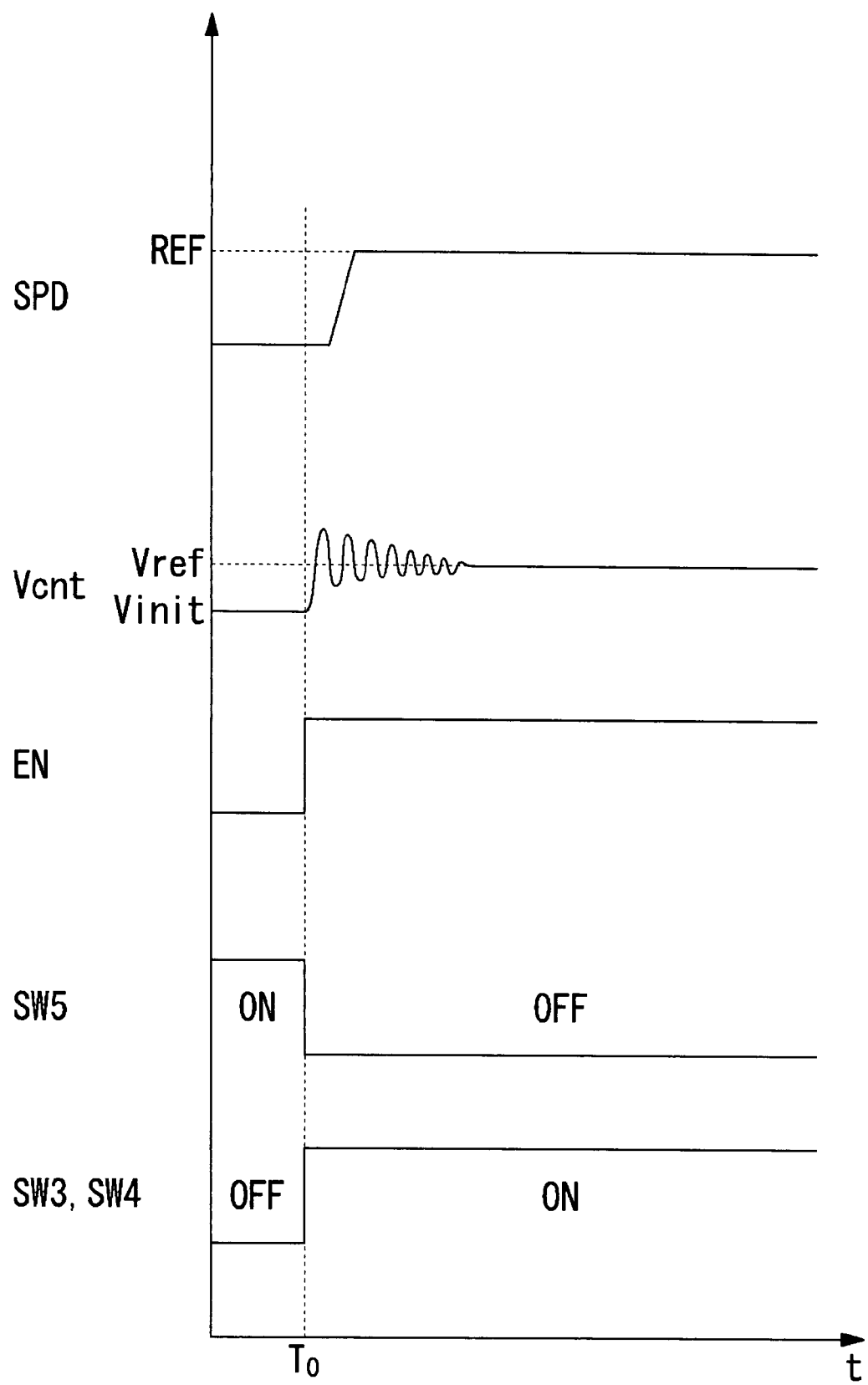
FIG. 3 is a signal waveform diagram showing an operating state of a motor driving apparatus when a start circuit is operated.

Next, a description will be given of a case where the start circuit 40 is operated. FIG. 3 is a signal waveform diagram showing an operating state of the motor driving apparatus 100 when the start circuit 40 is operated.

Before time T0, the fifth switch SW5 turns on and the start circuit 40 is set active. At this time, the control voltage Vcnt is fixed to an initial voltage Vinit. This initial voltage Vinit is set to a level lower than the clamping voltage Vcu of FIG. 2 and is also set to a level lower than the voltage Vref corresponding to a control target value.

As the enable signal EN goes to a high level, the fifth switch SW5 turns off in synchronism with the enable signal EN, and the third switch SW3 and the fourth switch SW4 turn on. As a result, the clamping circuit 20 becomes active and the fixation of the control voltage Vcnt is terminated.

The enable signal EN goes to the high level and the drive unit 120 starts driving the motor 200. Since at the start of driving it the control voltage Vcnt is fixed to the initial voltage Vinit which is set lower than the full torque, the motor 22 increases the rotation frequency more slowly than in the case of FIG. 2. Since the rotation frequency of the motor 200 rises more slowly than in the case of FIG. 2, a control can be performed so that control signal Vcnt follows the rotation frequency of the motor 200. Thus, it can be stabilized to a desired rotation frequency REF in a short length of time without causing an overshoot.

As described above, by employing the motor driving apparatus 100 according to the present embodiment, at the start of driving the motor 200 the control voltage Vcnt is fixed to a predetermined initial voltage Vinit by the start circuit 40. As a result, the starting time can be shortened and the occurrence of overshoot can be reduced.

In FIG. 3, the switching is made from the start circuit 40 to the clamping circuit 20 simultaneously with the instant the enable signal from outside goes to a high level. However, the speed signal SPD may be monitored, and when a predetermined value has been reached, the fifth switch SW5 of the start circuit 40 may be turned off and the third switch SW3 and the fourth switch SW4 of the clamping circuit 20 may be turned on. Also, after a predetermined passage of time has elapsed after the enable signal EN became a high level, the switching may be made from the start circuit 40 to the clamping circuit 20.

The start circuit 40 may adjust the initial voltage Vinit according to a drive condition of the motor 200. For instance, a register in which the initial voltage Vinit and the drive condition are brought into correspondence with each other may be prepared in the motor driving apparatus 100, and the initial voltage Vinit may be read out from the register, according to the drive condition.

Figure 4:
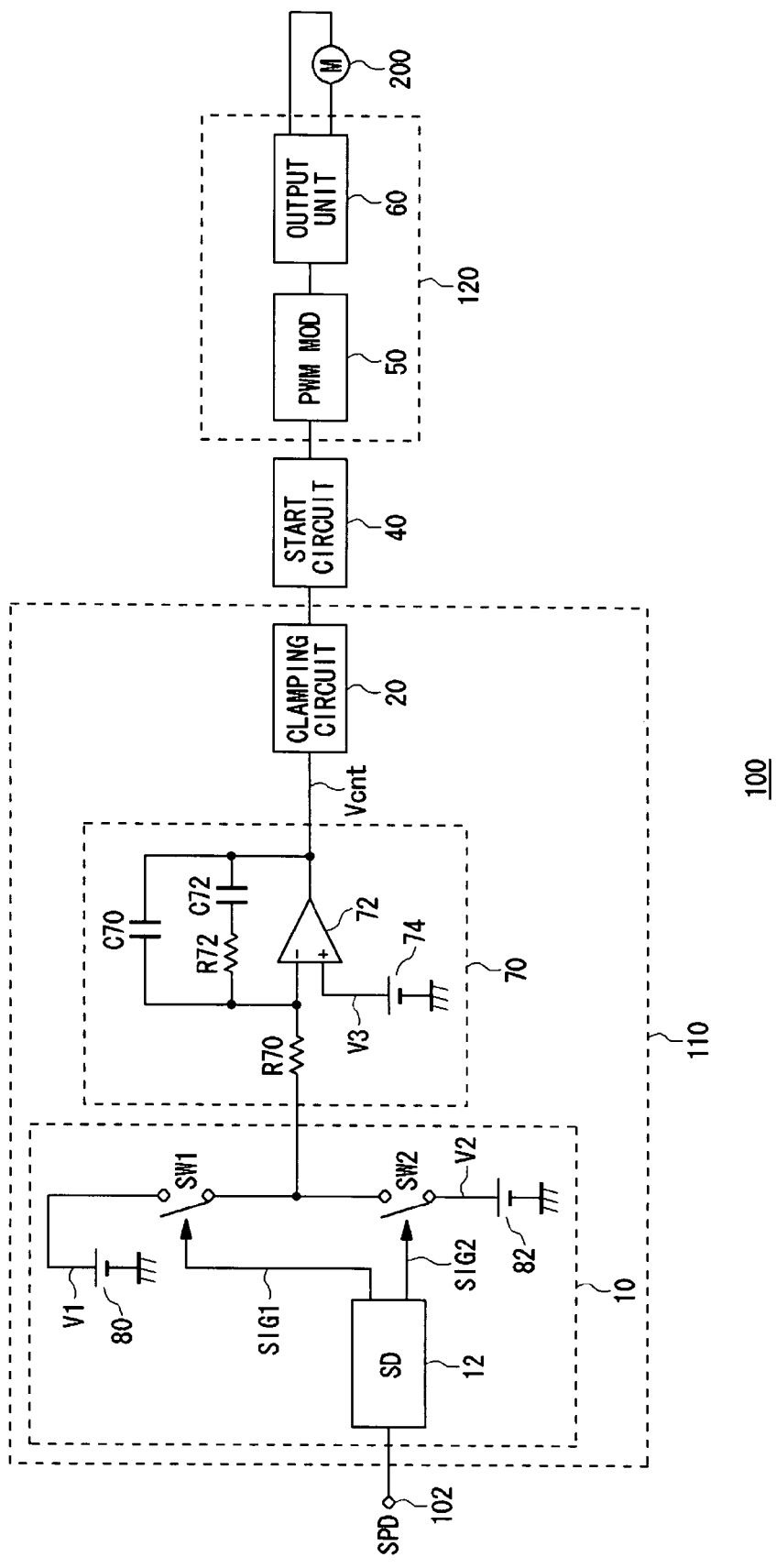
FIG. 4 is a circuit diagram showing a modification of a motor driving apparatus of FIG. 1.

FIG. 4 is a circuit diagram showing a modification of the motor driving apparatus 100 of FIG. 1. In the Figures from here on, the same reference numerals will be given to the same components as those of FIG. 1 and the repeated explanation thereof is omitted.

A control voltage generator 10 of FIG. 4 includes a first constant voltage source 80 and a second constant voltage source 82 in place of the first constant current source 14 and the second constant current source 16 of FIG. 4.

As an acceleration pulse SIG1 is outputted from a speed discriminator 12, a first switch SW1 turns on and then the control voltage generator 10 outputs a first voltage V1 outputted from the first constant voltage source 80. As a deceleration pulse SIG2 is outputted, the second switch SW2 turns on and then the control voltage generator 10 outputs a second voltage V2 outputted from the second constant voltage source 82.

A filter 70 includes an operational amplifier 72, a voltage source 74, resistors R70 and R72, and capacitors C70 and C72 so as to constitute an active filter. A constant voltage V3 outputted from the voltage source 74 is applied to a noninverting input terminal of the operational amplifier 72. Either one of the first voltage V1 and the second voltage V2 outputted from the control voltage generator 10 is applied to an inverting input terminal of the operational amplifier 72 via the resistor R70.

The capacitor C70 is connected between an output terminal of the operational amplifier 72 and the inverting input terminal. The capacitor C72 and the resistor R70 are connected in parallel with the capacitor C70.

The filter 70 integrates the first voltage V1 or the second voltage V2 outputted from the control voltage generator 10. And high-frequency components of the control voltage Vcnt is removed by the low-pass filter effect of the filter 70.

By employing the motor driving apparatus 100 according to the modification shown in FIG. 4, the same effects as in the motor driving apparatus 100 shown in FIG. 1 can be attained. Further, according to the modification of FIG. 4, the motor drive with higher accuracy can be carried out.

Figure 5:
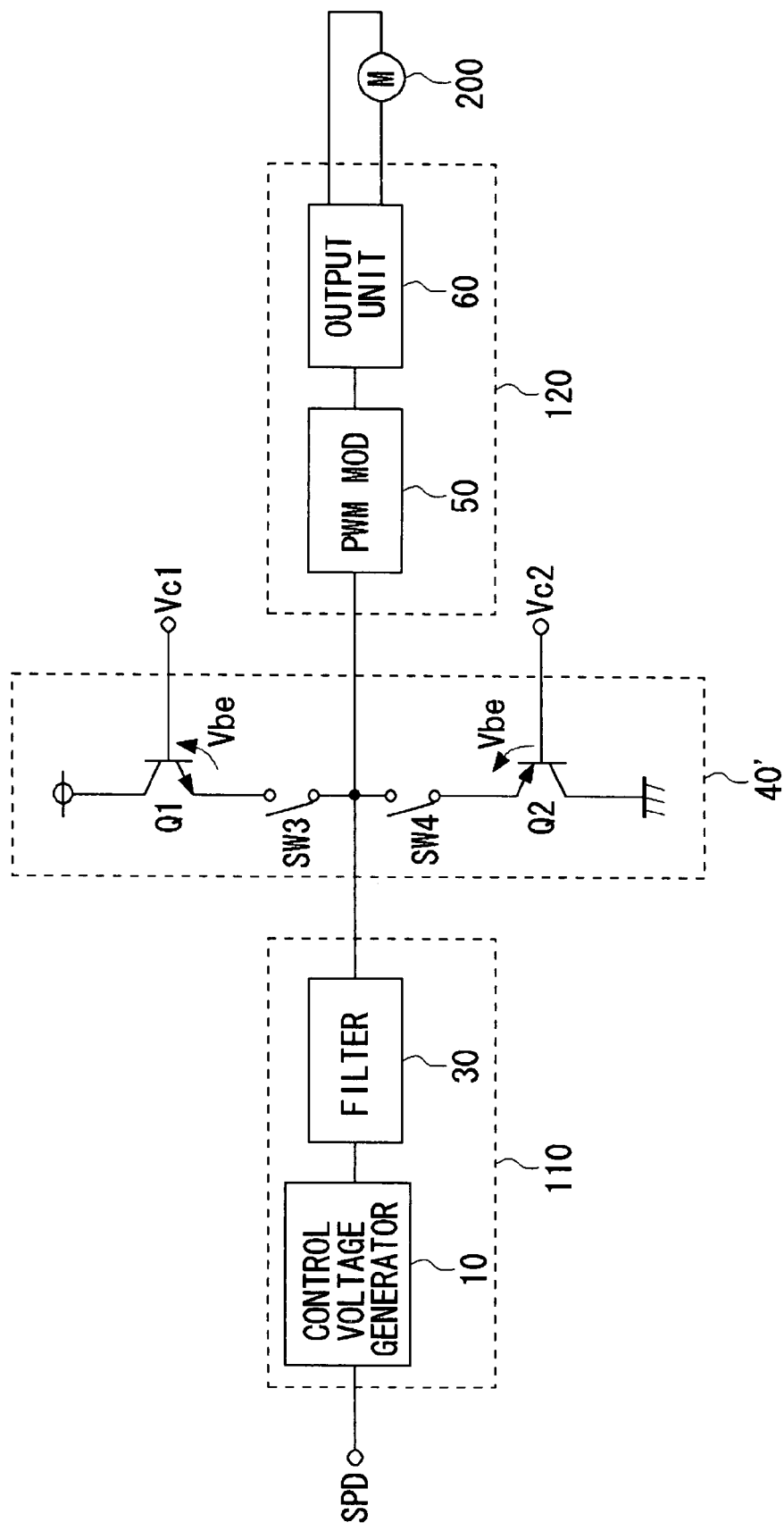
FIG. 5 is a circuit diagram showing another modification of a motor driving apparatus of FIG. 1.

FIG. 5 is a circuit diagram showing another modification of the motor driving apparatus 100 of FIG. 1. In this motor driving apparatus 100, a start circuit 40' is structured integrally with a clamping circuit 20.

By switching voltages Vc1 and Vc2 applied to base terminals of a first transistor Q1 and a second transistor Q2, respectively, the start circuit 40' of FIG. 5 can be operated as a function of the clamping circuit 20 and the start circuit 40 of FIG. 1.

Now, when voltages defining a maximum and a minimum torque of a motor 200 are applied to the base terminals of the first transistor Q1 and the second transistor Q2, respectively, it operates as a clamping circuit. When Vc1=Vinit+Vbe and Vc2=Vinit−Vbe are applied to the base terminals of the first transistor Q1 and the second transistor Q2, respectively, it operates as a start circuit where a control voltage Vcnt is fixed to the initial voltage Vinit.

An operation of the motor driving apparatus 100 structured as shown in FIG. 5 is described with reference to FIG. 3 again. Before time T0 of FIG. 3, the voltage Vc1=Vinit+Vbe is applied to the base terminal of the first transistor Q1, whereas the voltage Vc2=Vinit−Vbe is applied to the base of the second transistor Q2. This fixes the control voltage Vcnt to the initial voltage Vinit.

When at time T0 the base voltages of the first transistor Q1 and the second transistor Q2 are switched to the voltages defining the maximum and the minimum torque, the fixation of the control voltage Vcnt is terminated. Then the control voltage Vcnt starts rising and the rotation frequency of the motor 200 approaches a desired rotation frequency.

Similar to the motor driving apparatus 100 shown in FIG. 1, the starting time can be shortened and the occurrence of overshoot can be reduced by the motor driving apparatus 100 shown in FIG. 5.

Figure 6:
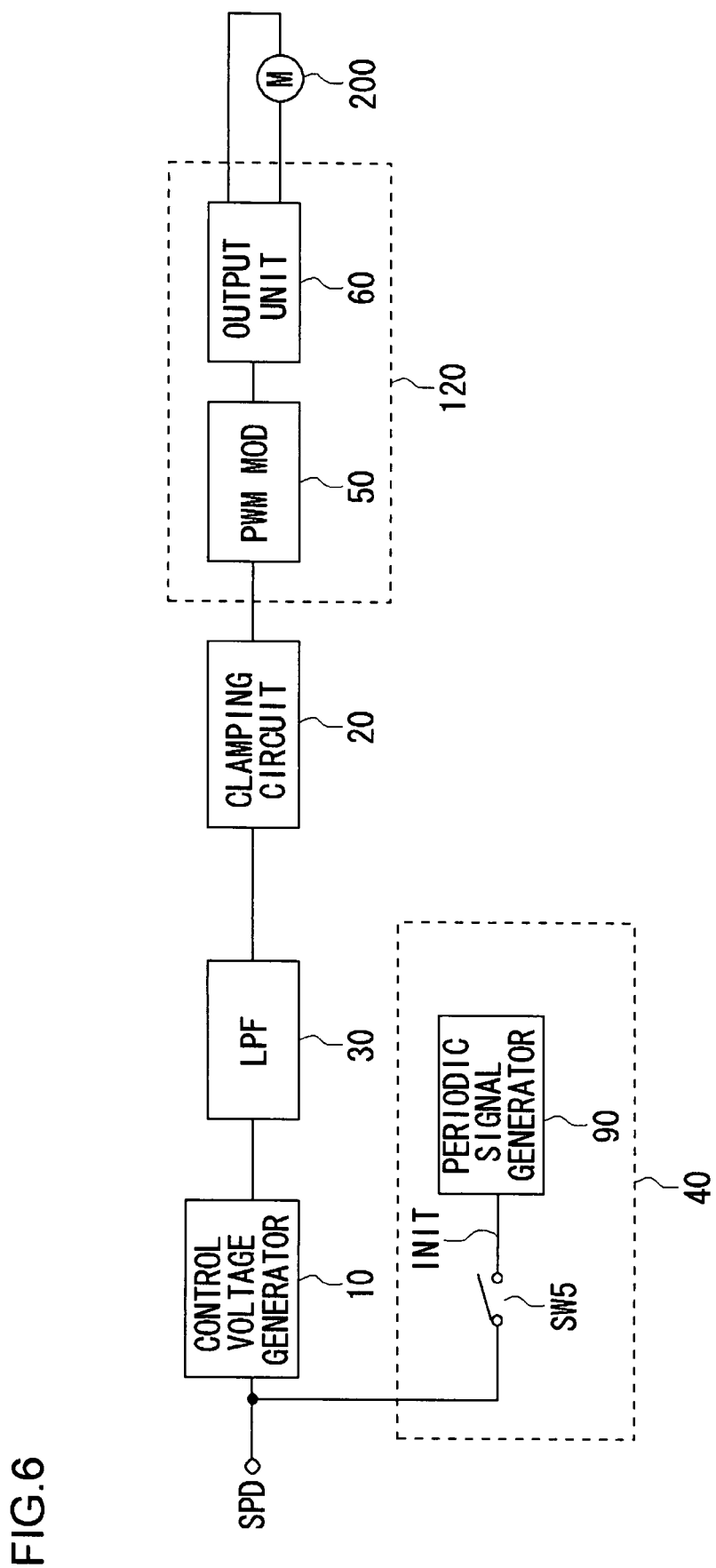
FIG. 6 is a circuit diagram showing still another modification of a motor driving apparatus of FIG. 1.

FIG. 6 is a circuit diagram showing still another modification of the motor driving apparatus 100 of FIG. 1. A start circuit 40 according to this modification fixes a speed signal SPD inputted to a speed discriminator 12 at the start of driving a motor 200, to a predetermined initial value INIT.

The start circuit 40 shown in FIG. 6 includes a periodic signal generator 90 and a fifth switch SW5. The periodic signal generator 90 generates an initial signal INIT having a predetermined frequency.

When, at the start of driving the motor, the fifth switch SW5 turns on and the start circuit 40 is set active, this initial signal INIT is inputted to a control voltage generator 10. As a result, the speed discriminator 12 compares the frequency of the initial signal INIT with that of a reference clock signal REF and then outputs an acceleration pulse SIG1 and a deceleration pulse SIG2.

According to the start circuit 40 shown in FIG. 6, the control voltage Vcnt is indirectly fixed by fixing the speed signal SPD. Thus, similar to the motor driving apparatus 100 shown in FIG. 1, the starting time can be shortened and the occurrence of overshoot can be reduced.

The above-described embodiments are merely exemplary, and it is understood by those skilled in the art that various further modifications to the combination of each component and process thereof are possible and that such modifications are also within the scope of the present invention.

In the embodiments, a description has been given of a case where the control voltage Vcnt is generated by using the speed discriminator 12 but it is not limited thereto. For example, a voltage appearing at the detection resistor Rd of the output unit 60 may be used as the speed signal. And an error voltage obtained by amplifying an error from a predetermined reference voltage may be used as a control signal Vcnt and this control Vcnt may be fixed at the start of driving the motor. Also, the control voltage Vcnt maybe fixed indirectly by fixing the voltage appearing at the detection resistor Rd.

In the embodiments, the motor 200 is driven by an H-bridge circuit but this should not be considered as limiting and the present invention is applicable to other drive methods. In the embodiments, the control voltage Vcnt is pulse-width modulated by the pulse width modulator 50 so as to drive the motor 200 based on the PWM signal Vpwm. However, it maybe linear driven based on the control voltage Vcnt.

In the present embodiments, the elements constituting a motor driving apparatus 100 may all be integrated in a single package, or may be formed by other separate integrated circuits and some of them may be comprised of discrete parts. Which of the parts is to be integrated may be determined in consideration of the cost, the area to be occupied, the usage and the like.

While the preferred embodiments of the present invention have been described using specific terms, such description is for illustrative purposes only, and it is to be understood that changes and variations may be made without departing from the spirit or scope of the appended claims.

What is claimed is:

1. A motor driving apparatus, comprising:
   a control unit which detects a rotation frequency of a motor to be driven and generates a control voltage in a manner such that the rotation frequency thereof is brought close to a desired rotation frequency;
   a drive unit which drives the motor based on the control voltage generated by said control unit; and
   a start circuit which fixes the control voltage to a predetermined initial voltage at the start of driving the motor;
   wherein the control unit includes a clamping circuit structured to set an upper limit and a lower limit of the control voltage; and
   wherein the clamping circuit comprises:
      a first transistor of NPN type having its base supplied with a minimum clamping voltage corresponding to the lower limit;
      a second transistor of PNP type having its base supplied with a maximum clamping voltage corresponding to the upper limit;
      a third switch provided between the emitter of the first transistor and an output terminal of the control unit; and
      a fourth switch provided between the emitter of the second transistor and the output terminal of the control unit.

2. A motor driving apparatus according to claim 1, wherein said start circuit adjusts the initial voltage according to a drive condition of the motor.

3. A motor driving apparatus according to claim 1,
   wherein said start circuit is set active for a predetermined period of time at the start of driving the motor, and said clamping circuit is set active after the predetermined period of time has elapsed.

4. A motor driving apparatus according to claim 3, wherein said clamping circuit is structured integrally with said start circuit, and at least one of the upper limit and the lower limit of the control voltage is set to the initial voltage for a predetermined period of time from the start of driving the motor.

5. A motor driving apparatus according to claim 1, said control unit including:
   a speed discriminator which generates an acceleration pulse and a deceleration pulse based on a deviation of a speed signal indicating the rotation frequency of the motor from the desired rotation frequency; and
   a voltage generator which generates the control voltage based on a pulse generated by the speed discriminator,
   wherein said start circuit fixes the speed signal inputted to the speed discriminator at the start of driving the motor, to a predetermined initial value.

6. A motor driving apparatus according to claim 1, wherein said start circuit adjusts a period of time during which the control voltage is fixed to the initial voltage, according to a drive condition of the motor.

7. A motor driving apparatus according to claim 1, wherein said start circuit fixes the control voltage for a period of time from the start of driving the motor until the rotation frequency of the motor reaches a predetermined rotation frequency.

* * * * *